United States Patent
Weber et al.

(10) Patent No.: US 11,845,590 B2
(45) Date of Patent: Dec. 19, 2023

(54) SELF-ADJUSTING PRELOAD FOR MEMORY ALLOY WIRE

(71) Applicant: CAREFUSION 303, INC., San Diego, CA (US)

(72) Inventors: Frank Dean Weber, San Diego, CA (US); Christoph Potakowskyj, Vienna (AT); Ernst Bayer, Vienna (AT)

(73) Assignee: CAREFUSION 303, INC., San Diego, CA (US)

( * ) Notice: Subject to any disclaimer, the term of this patent is extended or adjusted under 35 U.S.C. 154(b) by 0 days.

(21) Appl. No.: 17/745,694

(22) Filed: May 16, 2022

(65) Prior Publication Data

US 2022/0274744 A1 Sep. 1, 2022

Related U.S. Application Data

(60) Continuation of application No. 16/043,008, filed on Jul. 23, 2018, now Pat. No. 11,332,285, which is a
(Continued)

(51) Int. Cl.
*B65D 43/26* (2006.01)
*B65D 43/16* (2006.01)
(Continued)

(52) U.S. Cl.
CPC ........... *B65D 43/26* (2013.01); *B65D 43/164* (2013.01); *E05B 47/0009* (2013.01);
(Continued)

(58) Field of Classification Search
CPC ...... E05C 3/30; F03G 7/065; Y10T 292/1052; B65D 2251/10; B65D 2251/1066; B65D 2543/00194
See application file for complete search history.

(56) References Cited

U.S. PATENT DOCUMENTS 3,100,980 A * 8/1963 Humphries ......... E05B 65/5276 70/71
3,402,578 A * 9/1968 Atkinson ............ E05B 65/5253 292/199

(Continued)

FOREIGN PATENT DOCUMENTS

CN 101243261 A 8/2008
CN 101839099 A 9/2010
(Continued)

OTHER PUBLICATIONS

Chinese First Office Action for Application No. 201110194879.4, dated May 5, 2015, 11 pages.
(Continued)

*Primary Examiner* — Mark A Williams
(74) *Attorney, Agent, or Firm* — Morgan, Lewis & Bockius LLP (57) ABSTRACT

A preload mechanism for an actuator is disclosed that includes a rotating element configured to rotate about a pivot. The rotating element has a first contact point that is configured to couple to the actuator such that contraction of the actuator displaces the first contact point such that the rotating element rotates from a first position to a second position. The preload mechanism also includes a bias element with a first end that is coupled to a second contact point of the rotating element and a second end configured to be pinned relative to the pivot. The bias element has a line of action extending from the second end through the first end. The line of action has an offset distance that is the minimum distance between the line of action and the pivot. The offset distance has a first value when the rotating element is in the first position and a second value when the rotating element is the second position, the second value being smaller than the first value.

20 Claims, 7 Drawing Sheets

Related U.S. Application Data division of application No. 14/639,965, filed on Mar. 5, 2015, now Pat. No. 10,029,829, which is a division of application No. 13/012,742, filed on Jan. 24, 2011, now Pat. No. 8,974,641.

(51) Int. Cl.

| | | |
|---|---|---|
| *E05B 65/00* | (2006.01) | |
| *E05C 3/30* | (2006.01) | |
| *F03G 7/06* | (2006.01) | |
| *E05B 47/00* | (2006.01) | |

(52) U.S. Cl.
CPC ............. *E05B 65/006* (2013.01); *E05C 3/30* (2013.01); *F03G 7/065* (2013.01); *F03G 7/0614* (2021.08); *B65D 2251/10* (2013.01); *B65D 2251/1066* (2013.01); *B65D 2543/00194* (2013.01); *Y10T 292/1047* (2015.04); *Y10T 292/1052* (2015.04); *Y10T 292/68* (2015.04)

(56) References Cited

U.S. PATENT DOCUMENTS

| | | | | |
|---|---|---|---|---|
| 4,813,253 | A * | 3/1989 | Dumas | ............... E05C 5/00 |
| | | | | 70/76 |
| 5,684,448 | A | 11/1997 | Jacobsen | |
| 5,831,417 | A | 11/1998 | Chu | |
| 6,011,999 | A | 1/2000 | Holmes | |
| 6,116,461 | A | 9/2000 | Broadfield et al. | |
| 6,125,040 | A * | 9/2000 | Nobuchi | ............. E05B 63/14 |
| | | | | 312/223.1 |
| 6,290,270 | B1 * | 9/2001 | Spiessl | .............. E05C 3/24 |
| | | | | 292/216 |
| 6,327,879 | B1 * | 12/2001 | Malsom | ............ E05B 65/0811 |
| | | | | 292/210 |
| 6,338,007 | B1 | 1/2002 | Broadfield et al. | |
| 6,965,512 | B2 * | 11/2005 | Huang | ................ G06F 1/1679 |
| | | | | 361/679.55 |
| 7,017,345 | B2 | 3/2006 | Von Behrens | |
| 7,040,504 | B2 | 5/2006 | Broadfield et al. | |
| 7,630,789 | B2 | 12/2009 | Broadfield et al. | |
| 8,457,784 | B2 | 6/2013 | Rahilly et al. | |
| 8,635,868 | B2 | 1/2014 | Weber et al. | |
| 10,016,074 | B1 | 7/2018 | Finnegan | |
| 10,435,918 | B2 * | 10/2019 | Weber | ................ E05C 3/24 |
| 2004/0140678 | A1 * | 7/2004 | Linares | .................. E05C 3/24 |
| | | | | 292/216 |
| 2005/0160858 | A1 | 7/2005 | Mernoe | |
| 2008/0142522 | A1 * | 6/2008 | Maid | ................. E05B 47/023 |
| | | | | 70/159 |
| 2010/0112924 | A1 | 5/2010 | Alexander | |
| 2011/0063741 | A1 | 3/2011 | Park | |
| 2011/0088387 | A1 | 4/2011 | Von Behrens | |
| 2012/0108980 | A1 | 5/2012 | Shilling | |
| 2012/0156096 | A1 | 6/2012 | Allen | |
| 2012/0325768 | A1 | 12/2012 | Biesecker | |
| 2013/0081933 | A1 | 4/2013 | Browne | |
| 2013/0320820 | A1 | 12/2013 | Rahilly | |

FOREIGN PATENT DOCUMENTS

| | | |
|---|---|---|
| CN | 202338155 U | 7/2012 |
| WO | WO2010042129 A1 | 4/2010 |

OTHER PUBLICATIONS

Chinese First Office Action for Application No. 201120244826.4, dated Nov. 29, 2011, 5 pages.

International Search Report and Written Opinion for Application No. PCT/US2012/022247, dated Jul. 30, 2012, 7 pages.

\* cited by examiner

SELF-ADJUSTING PRELOAD FOR MEMORY ALLOY WIRE

CROSS-REFERENCE TO RELATED APPLICATIONS

This application is a continuation of U.S. patent application Ser. No. 16/043,008, entitled SELF-ADJUSTING PRELOAD FOR MEMORY ALLOY WIRE, filed on Jul. 23, 2018, which claims priority to and is a Divisional of U.S. patent application Ser. No. 14/639,965, entitled SELF-ADJUSTING PRELOAD FOR MEMORY ALLOY WIRE, filed on Mar. 5, 2015, now U.S. Pat. No. 10,029,829, which claims priority to and is a Divisional Application of U.S. patent application Ser. No. 13/012,742, entitled SELF-ADJUSTING PRELOAD FOR MEMORY ALLOY WIRE, filed on Jan. 24, 2011, now U.S. Pat. No. 8,974,641, the disclosure of each of which is incorporated herein by reference in its entirety.

BACKGROUND

The present disclosure generally relates to systems and methods of actuation, and, in particular, relates to the actuators utilizing memory alloy wire.

Providing secure storage frequently requires a container with a lid that is released only after certain requirements are met, such as verification that the individual accessing the container is authorized to do so. Systems of this type use an actuator of some type to release a latch that otherwise retains the lid in the closed position. Common actuators include solenoids and motors, both of which may be relatively large compared to the usable volume of the container, which decreases the volumetric efficiency of the container.

Actuators that utilize memory alloy wire can provide sufficient power and stroke to release the latch of a secure container while occupying less volume than a solenoid or motor. Memory alloy wire, also known as "muscle wire," is made from one of a number of alloys that contract in length when heated as the crystalline structure of the metal changes from its martensite form to its austenite form. Memory alloy wire can be stretched back to its original length as it cools to its original temperature and returns to its martensite form. Example alloys include nickel-titanium alloys that were first developed by the US Naval Ordnance Laboratory and commercialized under the trade name Nitinol (taken from the words Nickel Titanium Naval Ordnance Laboratories). The memory alloy wire is commonly heated by passing an electric current through the wire, creating heat within the wire due to the internal resistance of the wire.

When used as an actuator, a bias spring is often employed to preload the memory alloy wire and stretch the wire in the cold condition. The force of the preload reduces the amount of force that can be applied by the actuator. Loss of the preload force during the operational cycle may decrease the lifetime of the actuator.

U.S. Pat. No. 6,116,461, Method and Apparatus for the Dispensing of Drugs, Broadfield et al., discloses an Automated Dispensing Machine (ADM) that utilizes a memory alloy wire actuator. While this system was a significant advance in the dispensing of medications, the memory wire is preloaded by a linear spring that applies an increasing amount of force to the memory alloy wire as the actuator moves, reducing the amount of force that can be applied by the actuator.

SUMMARY

In order to provide a more robust and reliable actuator, it is advantageous to provide a memory alloy actuator that provides a continuous preload force while reducing this preload force during actuation to increase the amount of available force. The disclosed system includes a memory wire actuator incorporating a self-adjusting preload that provides such benefits.

Certain embodiments comprise a preload mechanism for a memory alloy wire actuator that includes a rotating element configured to rotate about a pivot. The rotating element has a first contact point that is configured to couple to the memory alloy wire actuator such that contraction of the memory alloy wire actuator displaces the first contact point such that the rotating element rotates from a first position to a second position. The preload mechanism also includes a bias element with a first end that is coupled to a second contact point of the rotating element and a second end configured to be pinned relative to the pivot. The bias element has a line of action extending from the second end through the first end. The line of action has an offset distance that is the minimum distance between the line of action and the pivot. The offset distance has a first value when the rotating element is in the first position and a second value when the rotating element is the second position, the second value being smaller than the first value.

Certain embodiments comprise an actuator assembly that includes a memory alloy wire actuator, a rotating element having first and second contact points and a pivot wherein the rotating element is configured to rotate about the pivot, and a bias element having first and second ends, the first end coupled to the second contact point of the rotating element and the second end configured to be pinned relative to the pivot. The first contact point of the rotating element is configured to couple to the memory alloy wire actuator such that contraction of the memory alloy wire actuator displaces the first contact point such that the rotating element rotates from a first position to a second position. The memory alloy wire actuator includes a memory alloy wire having first and second ends and at least one terminal coupled to one end of the memory alloy wire. The bias element has a line of action extending from the second end through the first end. The actuator assembly has an offset distance that is the minimum distance between the line of action and the pivot, wherein the offset distance has a first value when the rotating element is in the first position and a second value when the rotating element is the second position, and the second value is smaller than the first value.

Certain embodiments comprise a lidded container that includes a memory alloy wire actuator, a rotating element, and a bias element. The memory alloy wire actuator comprises a memory alloy wire having first and second ends, and at least one terminal coupled to one end of the memory alloy wire. The rotating element has first and second contact points and a pivot, wherein the rotating element is configured to rotate about the pivot. The first contact point is configured to couple to the memory alloy wire actuator such that contraction of the memory alloy wire actuator displaces the first contact point such that the rotating element rotates from a first position to a second position. The bias element has a first end coupled to the second contact point of the rotating element and a second end configured to be pinned relative to the pivot. The bias element has a line of action extending from the second end through the first end. The actuator assembly has an offset distance that is the minimum distance between the line of action and the pivot. The offset distance has a first value when the rotating element is in the first position and a second value when the rotating element is the second position, the second value being smaller than the first value.

Certain embodiments comprise an Automated Dispensing Machine (ADM) that includes a cabinet and a plurality of lidded containers coupled to the cabinet. Each of the lidded containers has a securable lid having a closed position and an open position, and a latch release mechanism configured to releasably secure the lid in the closed position. The latch release mechanism includes a memory alloy wire actuator assembly configured to cause the latch release mechanism to release the lid from the closed position and allow the lid to move to the open position. The actuator assembly comprises a memory alloy wire actuator, a rotating element, and a bias element. The memory alloy wire actuator includes a memory alloy wire having first and second ends, and at least one terminal coupled to one end of the memory alloy wire. The rotating element is configured to rotate about a pivot and has a first contact point that is configured to couple to the memory alloy wire actuator such that contraction of the memory alloy wire actuator displaces the first contact point such that the rotating element rotates from a first position to a second position. The bias element has a first end coupled to a second contact point of the rotating element and a second end that is configured to be pinned relative to the pivot. The bias element has a line of action extending from the second end through the first end. The actuator assembly has an offset distance that is the minimum distance between the line of action and the pivot. The offset distance has a first value when the rotating element is in the first position and a second value when the rotating element is the second position, the second value being smaller than the first value. A controller is coupled to the cabinet and the lidded containers. The controller is configured to actuate the memory alloy wire actuator of a selected container upon receipt of a command to open the lid of the selected container.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The disclosed embodiments of memory alloy wire systems provide a self-adjusting pre-load mechanism for a memory alloy wire that reduces cyclic stresses and increases the operational life of the actuator.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

The method and system disclosed herein are presented in terms of a container having a lid with a hook that is retained by a release mechanism. It will be apparent to those of ordinary skill in the art that the disclosed concepts may be applied to a variety of mechanisms utilizing memory alloy wire. Nothing in this disclosure should be interpreted, unless specifically stated as such, to limit the application of any method or system disclosed herein to latch or closure mechanisms.

Figure 1:
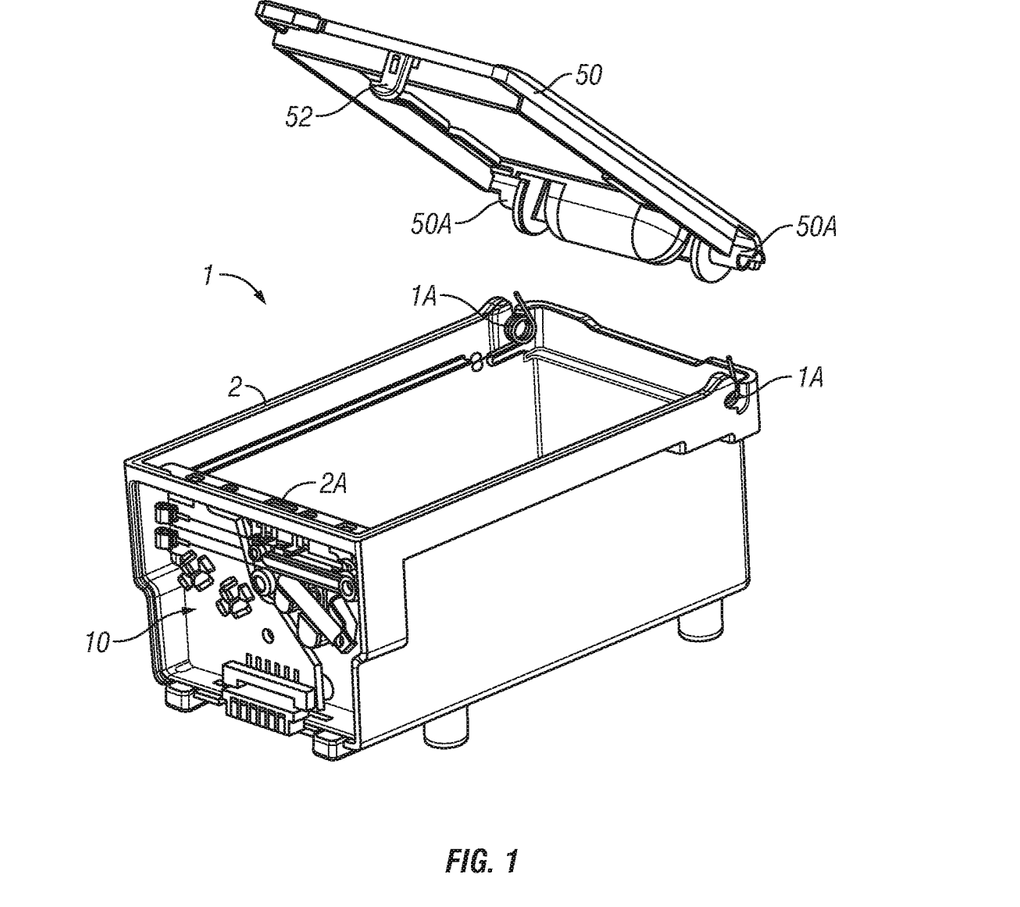
FIG. 1 is a partially exploded view of a lidded container according to certain aspects of this disclosure.

FIG. 1 is a partially exploded view of a lidded container 1 according to certain aspects of this disclosure. The container 1 comprises a body 2 and a lid 50 that is hingedly attached to body 2 through engagement of pivot pins 50A with the pin capture features 1A. When the lid 50 is closed, lid hook 52 passes through the hole 2A in body 2 and comes into proximity with the latch release mechanism 10 that is visible in FIG. 1 within a front compartment of body 2 (a front cover plate of body 2 has been omitted to make visible the latch release mechanism 10).

Figure 2A:
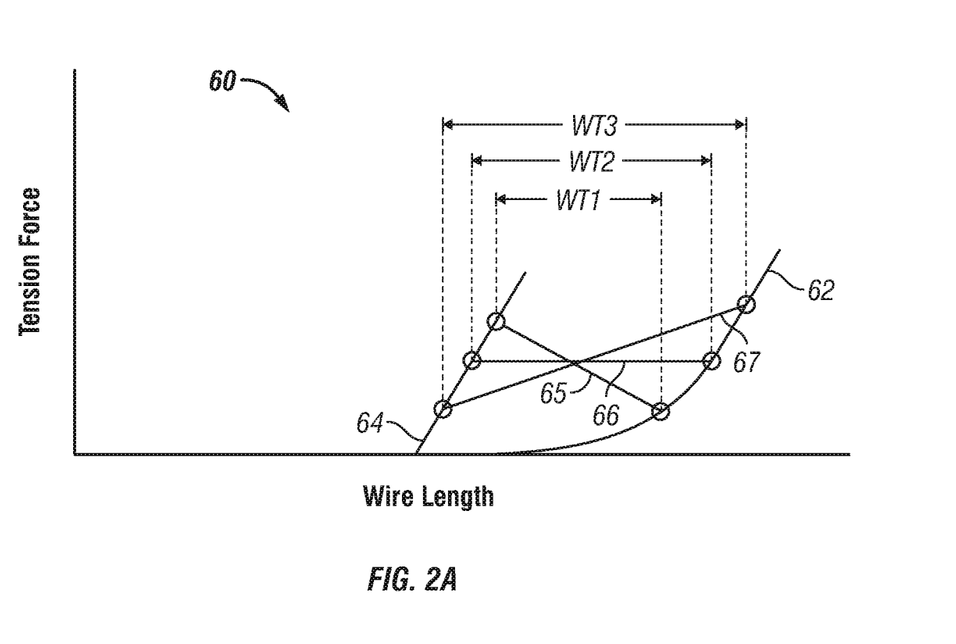
FIGS. 2A-2B depict memory alloy wire performance characteristics according to certain aspects of this disclosure.
Figure 2B:
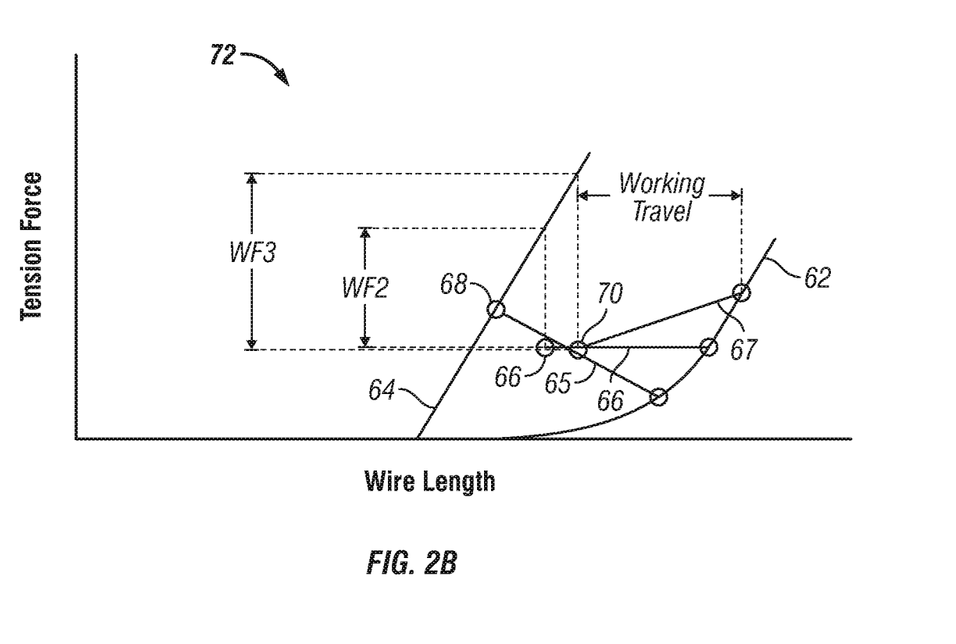

FIGS. 2A-2B depict memory alloy wire performance characteristics according to certain aspects of this disclosure. FIG. 2A depicts a plot 60 typical memory alloy wire working travel performance, and is not shown to scale. The cold performance curve 62 is the length of the wire under preload tension in the "rest" condition before actuation. The hot performance curve 64 shows the limit to how far the memory alloy wire can reliably be contracted when used as an actuator. The three actuator operation curves 65, 66, and 67 show the difference in travel depending on how the tension changes during the travel. Actuator operation curve 65 shows the force vs. length curve that the memory alloy wire follows when the applied tension increases with travel, resulting in a useful amount of actuator travel or "stroke" shown in FIG. 2A as distance WT1. Actuator operation curve 66 shows the force vs. length curve that the memory alloy wire follows when the applied tension is constant during travel, resulting in a useful amount of actuator stroke shown as distance WT2. Actuator operation curve 66 shows the force vs. length curve that the memory alloy wire follows when the applied tension decreases during travel, resulting in a useful amount of actuator stroke shown as distance WT3. It can be seen from plot 60 that an actuator mechanism that decreases the tension on the memory alloy wire during actuation provides the longest stroke.

FIG. 2B depicts a plot 72 that shows the useful force available at the end of stroke of the same actuators of FIG. 2A, wherein each actuator has the same stroke. Actuator operation curve 65, which shows the force vs. length curve that the memory alloy wire follows when the applied tension increases with travel, has no remaining force margin after completion of the working travel as the end condition at point 68 lies on the hot performance curve 64. This actuator will only achieve this stroke if there is zero friction or other resistive force. Actuator operation curve 66, wherein the applied tension is constant during the stroke, arrives at point 69 at the end of the specified stroke, which is less than its capability, resulting in an available working force shown in FIG. 2B as WF2. Actuator operation curve 67, wherein the applied tension decreases with travel, arrives at point 70 at the end of the specified stroke, resulting in an available working force shown in FIG. 2B as WF3. The available working forces WF2 and WF3 represent the amount of force that can be applied at the end of travel by each actuator to overcome friction or other resistive forces.

Figure 3:
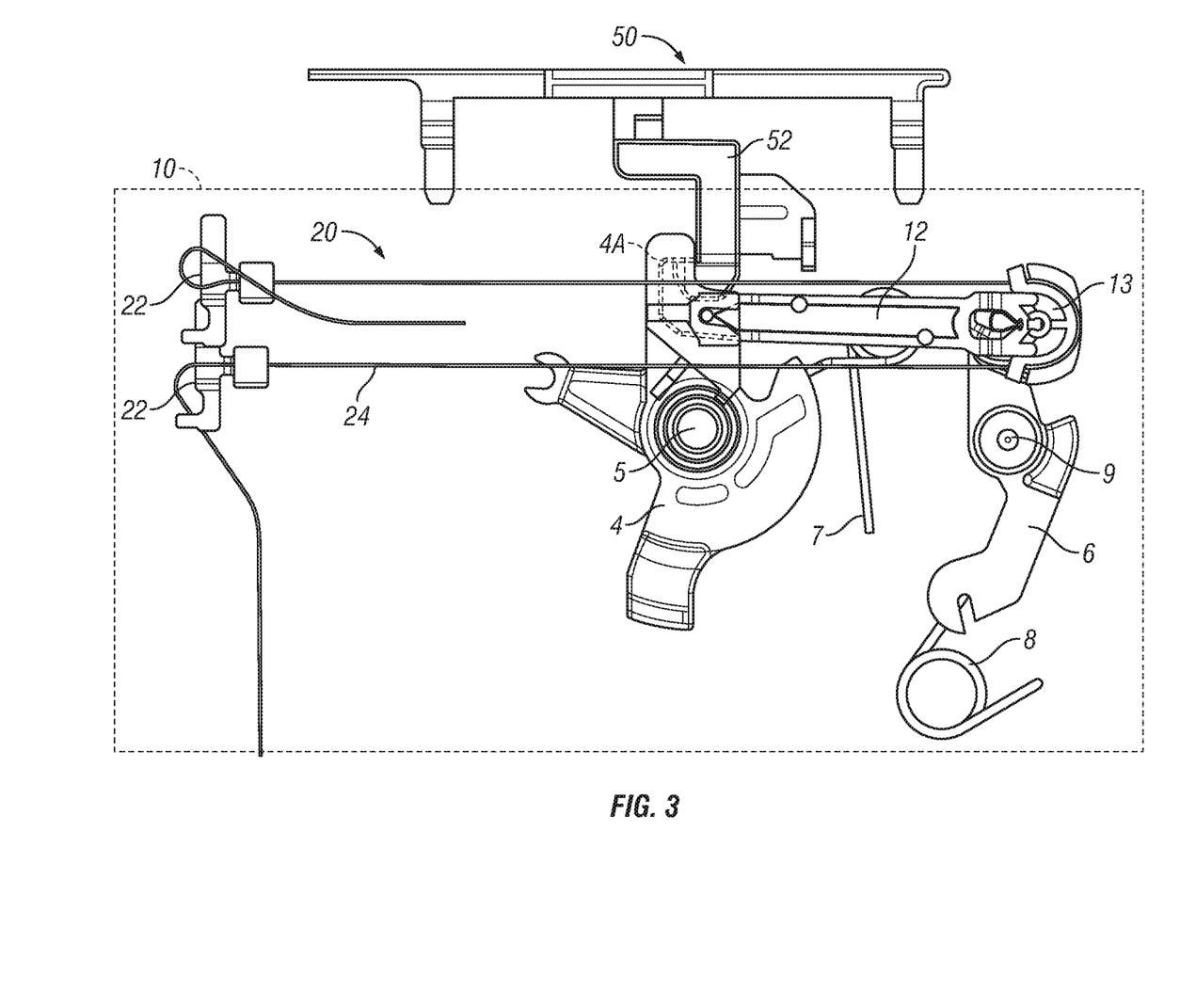
FIG. 3 depicts a lid release mechanism according to certain aspects of this disclosure.

FIG. 3 depicts the latch release mechanism 10 according to certain aspects of this disclosure. The latch release mechanism 10 is configured to retain lid 50 in a closed position when in the position shown in FIG. 3. The fixed elements of latch release mechanism 10 are attached to body 2 (not shown in this view) and therefore fixed in position and orientation relative to the lid 50 and to each other. Latch lever 4 has rotated in a clockwise direction about a fixed pivot 5 such that latch hook 4A, which is located on the end of one of the arms of latch lever 4, has engaged the lid hook 52. Spring 7 applies a force to latch lever 4 that causes a clockwise torque about pivot 5 to be applied to latch lever 4, maintaining the latch lever 4 in the position shown in FIG. 3.

The latch release mechanism 10 includes a memory alloy wire actuator 20 which wraps around capstan 13. Capstan 13 is in contact with one end of plunger 12, the other end of plunger 12 being in contact with latch lever 4. In certain embodiments, capstan 13 and plunger 12 are fixedly connected. The terminals 22 of memory alloy wire actuator 20 are mounted to the body 2, with details of the mounting discussed in relation to later figures. The length of memory alloy wire actuator 20 limits the range of travel of capstan 13 to the right, which then limits the motion of plunger 12 and consequently the clockwise rotation of latch lever 4. The torque applied by spring 7 causes the latch lever 4 to rotate clockwise until it reaches this limit. The mounting location of terminals 22 and the dimensions of capstan 13, plunger 12, and latch lever 4 are chosen to cause the latch hook 4A to be in this "latched" position, wherein latch hook 4A is engaged with latch hook 52 without applying a lateral force to the latch hook 52. When in the latched position, the torque applied by spring 7 applies a force to plunger 12 and thereby to capstan 13, which then transfers this force to the memory alloy wire 24 of the memory alloy wire actuator 20, placing the memory alloy wire 24 in tension.

The latch release mechanism 10 also includes a cantilever 6 that rotates about a fixed pivot 9. At one end, cantilever 6 engages a feature of plunger 12 at the same point that plunger 12 contacts capstan 13. A cantilever spring 8 applies a force to the other end of cantilever 6. This force creates a clockwise torque about the pivot 9, which rotates cantilever 6 about the pivot causing the first end to push plunger 12 towards the capstan 13 that is constrained from further lateral motion by the memory alloy wire actuator 20. The force applied by cantilever 6 to plunger 12 is applied parallel to and additive with the force applied by latch lever 4 to the plunger 12 and the sum of these forces is applied to capstan 13.

The latch lever 4, plunger 12, and cantilever 6 form a 4-bar linkage with the fourth element being the body 2 to which the latch lever 4 and cantilever 6 are pinned. The plunger 12 is configured such that, over the range of motion of the memory alloy wire actuator 20, the plunger 12 moves approximately along the line of action of the memory alloy wire actuator 20 without rotation of the plunger or capstan. This gives equal contraction and loading of the 2 segments of the muscle wire, thus maintaining equal loading to the 2 segments, preventing slippage of the memory alloy wire 24 around the capstan thereby improving the operational life of the memory alloy wire actuator 20.

In operation, lid 50 is released when a current is passed through memory alloy wire actuator 20. The memory alloy wire 24 contracts due to the conversion from its martensite form to its austenite form caused by heating induced by the current passing through the resistance of the memory alloy wire 24. This contraction force is applied to capstan 13 in the direction opposing the forces applied by plunger 12 and cantilever 6. As the memory alloy wire 24 contracts, capstan 13 moves to the left causing latch lever 4 and cantilever 6 to rotate counterclockwise, releasing the lid hook 52, which allows the lid 50 to open under the influence of the lid springs (not shown). When the opening of the lid 50 is detected by a lid sensor (not shown) the current through memory alloy wire 24 is shut off.

Figure 4:
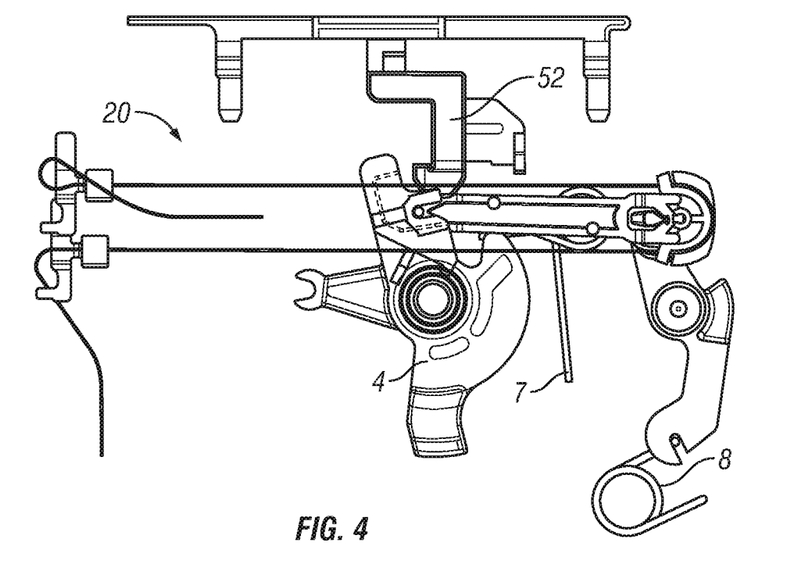
FIG. 4 depicts the lid release mechanism of FIG. 1 in the unlatched position according to certain aspects of this disclosure.

FIG. 4 depicts the latch release mechanism 10 of FIG. 3 in the unlatched position according to certain aspects of this disclosure. In this embodiment, the memory alloy wire actuator 20 has sufficient current flowing through the memory alloy wire 24 from an external circuit (not shown) to cause the memory alloy wire 24 to contract approximately 2%, which is a commonly used target contraction value for memory alloy wire. In certain embodiments, the memory allow wire 24 contracts approximately 3.5%. The contraction has overcome the force applied by the plunger 12 and cantilever 6 and displaced Capstan 13 and plunger 12 to the left, rotating latch lever 4 sufficiently to disengage lid hook 52 and thereby release lid 50. In this example, the lid 50 is spring-loaded and the lid 50 will self-open upon release of lid hook 52.

Figure 5:
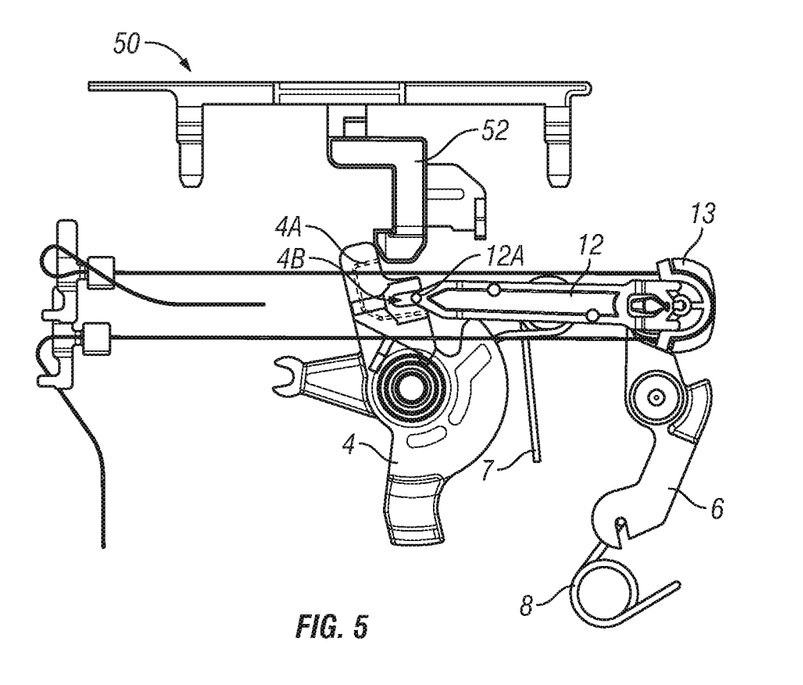
FIG. 5 depicts the lid release mechanism of FIG. 1 as the lid is being closed according to certain aspects of this disclosure.

FIG. 5 depicts the latch release mechanism 10 of FIG. 1 as the lid 50 is being closed according to certain aspects of this disclosure. As the lid 50 closes, the angled underside of lid hook 52 comes into contact with the top corner of latch lever 4, rotating the latch lever 4 counterclockwise. This rotation compresses spring 7 but does not pull plunger 12 to the right, as the engagement of plunger 12 with latch lever 4 is through pin 12A that fits into slot 4B. While clockwise rotation of latch lever 4 applies a compressive force to plunger 12 through pin 12A, counterclockwise rotation does not create a tension force in plunger 12 as pin 12A is not attached to latch lever 4. As latch lever 4 rotates counterclockwise, the slot 4B pulls away from pin 12A, which is maintained in its original position by the force applied by the cantilever 6 to the other end of plunger 12. Slot 4B is long enough that pin 12A does not disengage from the slot 4B as the lid closes.

The force applied by cantilever 6 maintains tension in the memory alloy wire 24 while the lid is being closed, which is a primary function of cantilever 6 and cantilever spring 8. Without cantilever 6 and cantilever spring 8, the tension in memory alloy wire 24 would go to zero as the latch lever 4 rotates during lid closure. In addition, without cantilever 6 and cantilever spring 8, the memory alloy wire 24 would be subjected to a shock load when the lid hook 52 passes below the lid hook 4A, as the latch lever 4 would snap back to its original position under the influence of spring 7. Both the repeated loss of tension and the shock load that would be experienced by memory alloy wire 24 upon each lid closure are detrimental to the operational lifetime of memory alloy wire.

Figure 6:
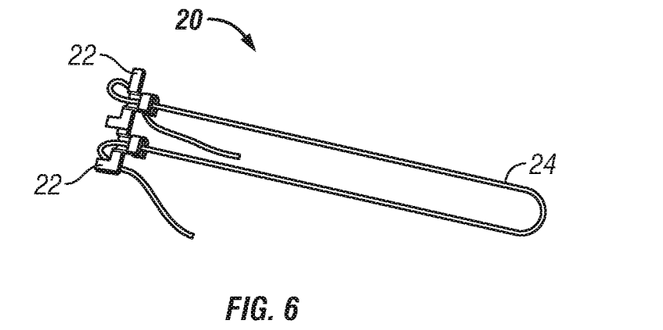
FIG. 6 depicts a memory alloy wire actuator according to certain aspects of this disclosure.

FIG. 6 depicts a memory alloy wire actuator 20 according to certain aspects of this disclosure. In this embodiment, the memory alloy wire actuator 20 comprises a length of memory alloy wire 24 with a terminal 22 attached at each end. The memory alloy wire actuator 20 is formed into the "U" shape to provide twice the actuation force of a single wire.

Figure 7A:
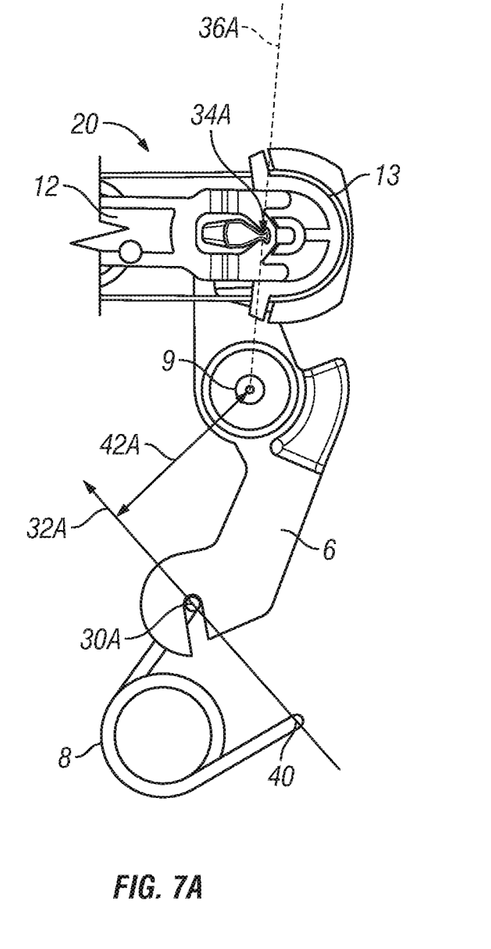
FIGS. 7A-7B depict a self-adjusting preload mechanism according to certain aspects of this disclosure.
Figure 7B:
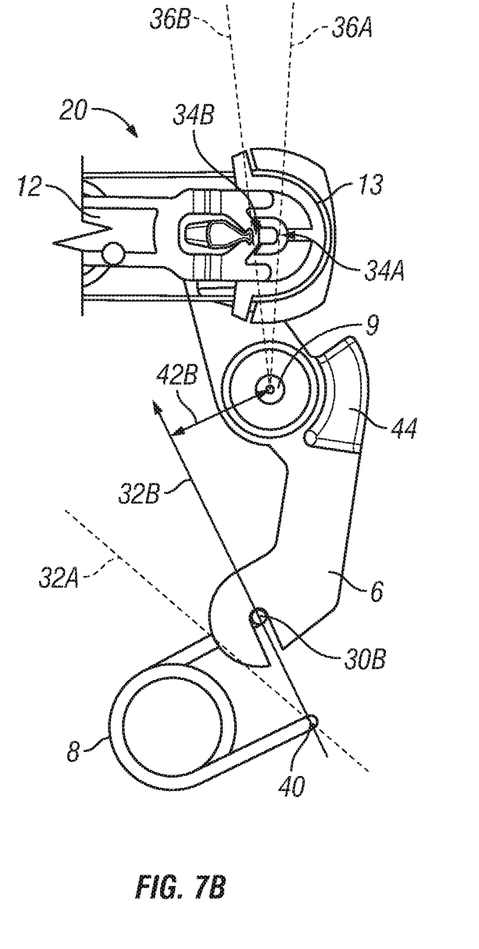

FIGS. 7A-7B depict a self-adjusting preload mechanism according to certain aspects of this disclosure. The preload mechanism includes the cantilever 6, which rotates about the pivot 9, and the cantilever spring 8. The pivot of the cantilever 6 is the hole in the cantilever body, wherein the hole is sized to fit closely about a pin that is fixed in a support structure (not shown). The cantilever 6 shown in FIGS. 7A and 7B is one embodiment of a rotating element having two contact points 30 and 34, shown as 30A, 34A in FIGS. 7A and 30B, 34B in FIG. 7B, and a pivot 9. In other embodiments, the two arms that extend from the pivot 9 to the contact points 30, 34 are at an angle to each other. In certain embodiments, the contact points 30, 34 are disposed on a common arm extending from pivot 9. Similarly, the cantilever spring 8 shown in FIGS. 7A and 7B is one embodiment of a bias element that applies a force to a point. Other embodiments of the bias element include a constant force mechanism, a linear coil compression spring, a diaphragm spring, an elastic tension element, and a gas spring.

The cantilever 6 is configured to rotate about the pivot 9, and the contact point 34 is configured to couple to the memory alloy wire actuator 20. In the embodiment of FIGS. 7A and 7B, there is a capstan 13 around which the memory alloy wire 24 of the memory wire actuator 20 passes, wherein the cantilever 6 couples to the capstan 13. In certain embodiments, this coupling is a knife-edge contact. The contact point 30 is coupled to one end of the cantilever spring 8, wherein the cantilever spring end can rotate with respect to the cantilever 6 but moves with the contact point 30 as the cantilever 6 rotates. The second end of the cantilever spring 8 is pinned to a point 40 on the support structure (not shown) such that the second end cannot translate but can rotate with respect to the pivot pin that is fixed to the same support structure. With both the second end of cantilever spring 8 and the pivot of cantilever 6 pinned to the same support structure, a force can be developed at contact point 30 between the first end of the cantilever spring 8 and the cantilever 6, as will be discussed further below.

FIG. 7A depicts the configuration of the memory wire actuator assembly, comprising the memory alloy wire actuator 20 and the self-adjusting preload mechanism, in the "rest" state, i.e. when there is no current flowing through the memory alloy wire 24. The cantilever spring 8 is compressed such that the cantilever spring 8 applies a force at contact point 30A to cantilever 6. The force is applied along a line of action 32A passing through the contact point 30A and the fixed point 40. This line is offset from pivot by a distance 42A measured as the minimum distance between the line of action 32A and the pivot 9. The force applied by the cantilever spring 8 creates a torque on cantilever 6 about pivot 9, causing the cantilever 6 to rotate clockwise about pivot 9 until constrained by the memory wire actuator 20 acting through capstan 13 to apply a counteracting force at contact point 34A. The force applied to the cantilever 6 at contact point 34A is applied in a direction approximately parallel to the two memory alloy wires 24, which are parallel to each other in this embodiment. The position of cantilever 6 is defined by a line 36A passing through the center of pivot 9 and the contact point 34A.

FIG. 7B depicts the memory wire actuator assembly of FIG. 7A while a current is passing through the memory alloy wire actuator 20. The heating of the memory alloy wire 24 causes the wire to contract, displacing the contact point 34 to the location 34B, which is different from location 34A of FIG. 7A. This displacement causes cantilever 6 to rotate from position 36A to 36B as determined by a line through the pivot 9 and the location 34B. This rotation of cantilever 6 causes contact point 30 to move from location 30A to 30B. The force applied by cantilever spring 8 is now applied along a line of action 32B which has an offset distance of 42B from the pivot 9. The force applied by cantilever spring 8 to contact point 30 while cantilever 6 is in position 36B is, in this embodiment, greater than the force applied to contact point 30 while cantilever 6 is in position 36A. In certain embodiments, the force is constant in all positions while in other embodiments. In certain embodiments, the force applied by cantilever spring 8 to contact point 30 while cantilever 6 is in position 36B is, in this embodiment, less than the force applied to contact point 30 while cantilever 6 is in position 36A. Regardless of the amount of force applied, the offset distance 42B is less than the offset distance 42A. Selection of the point 40, with respect to the positions 30A and 30B, controls the relative increase of the applied force compared to the decrease in offset distance 42B compared to distance 42A. In the embodiment of FIG. 7B, there is a decrease in the torque applied to cantilever 6 from the amount of torque applied in FIG. 7A. This decrease in torque reduces the tension in the memory wire thereby increasing the available force that can be applied to the latch lever 4 to release the lid 50.

Cantilever 6 can be seen to have a mass 44 attached to one side of the rotating element. This mass is added to balance the rotating element such that the center of gravity (CG) of the rotating element is located at the center of pivot 9. Without this mass 44, the CG of this embodiment of cantilever 6 would be to the left and above the center of pivot 9. In the case of a translational acceleration, such as might be experienced if the lidded container 1 was dropped on its side, the acceleration of the CG would produce a torque on the cantilever 6 about the pivot 9. If this moment was large enough, it might cause the cantilever 6 to rotate counterclockwise in the same manner as occurs during the opening of the lid, resulting in the lid unintentionally opening. Positioning the CG on the center of pivot 9 prevents the generation of a torsional moment on the rotating element reduces due to a translational acceleration and thereby reducing the likelihood of the lidded container 1 accidentally opening when dropped.

Figure 8:
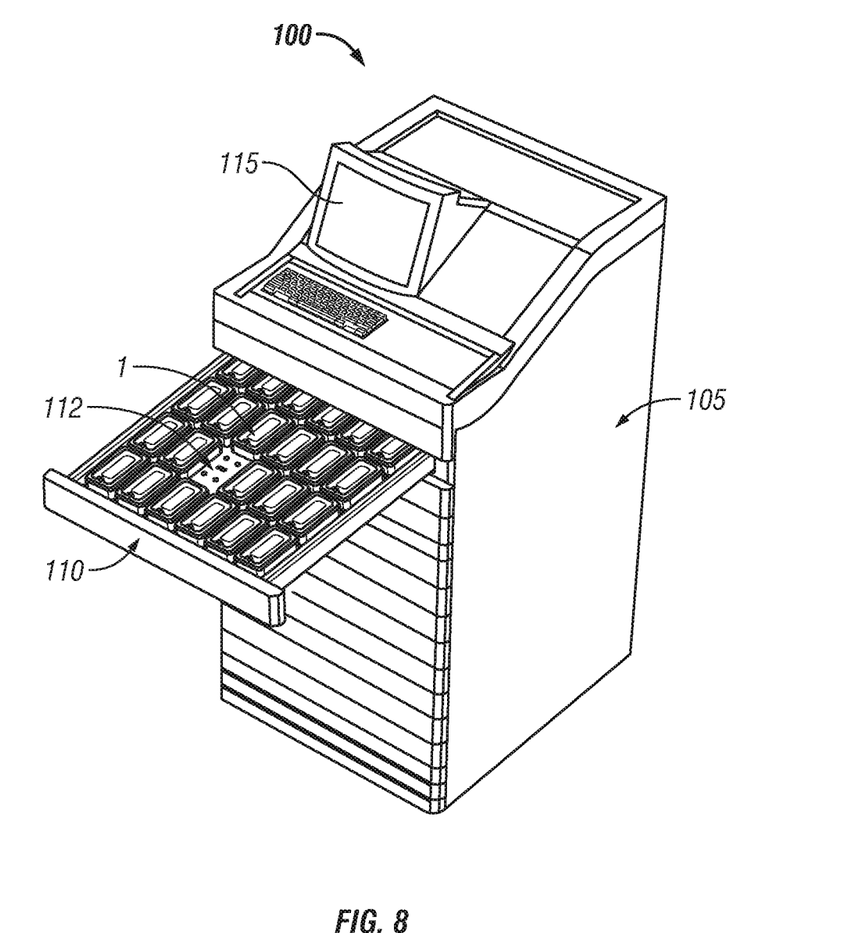
FIG. 8 illustrates an exemplary ADM that includes removable lidded containers that include memory alloy wire with a self-adjusting preload mechanism according to certain aspects of this disclosure.

FIG. 8 illustrates an exemplary ADM 100 that includes removable lidded containers 1 that include memory alloy wire actuators 20 and self-adjusting preload mechanisms according to certain aspects of this disclosure. The ADM 100 includes a cabinet 105 with a controller 115 that is, in this example, housed in the top structure of the ADM 100. The controller includes a processor with a memory (not shown), a display, a keyboard and touchscreen input devices, a power supply (not shown), and communication modules (not shown) that couple the processor to the internal components of the ADM and to external networks. In certain embodiments, the ADM includes a barcode scanner (not shown) that is fixedly or removably mounted to the top structure or cabinet. The ADM also includes a drawer 110 that is configured to accept the lidded containers 1 from FIG. 1, wherein the lidded containers 1 and the drawer 110 both include complementary mating connectors that couple the lidded containers to the controller when the lidded containers are accepted by the drawer. The drawer 110 has multiple locations 112 configured to accept a lidded container 1. In certain embodiments, the lidded containers are attached to fixed parts of the cabinet, such as a shelf or inclined surface. In certain embodiments, the lidded containers are not separate from the structure of the cabinet, wherein the equivalent to the body 2 of FIG. 1 is integrally formed into the structure of the cabinet. In certain embodiments, the equivalent to the body 2 of FIG. 1 is integrally formed into the structure of the drawer, wherein the compartments formed by the bodies 2 in such a structure have individual lids mounted to the common drawer structure. In certain embodiments, the cabinet 105 is a smaller structure having only a few drawers 110, wherein the storage capacity of the ADM 100 is suitable for a single patient rather than a plurality of patients. In certain embodiments, the cabinet 105 is mounted to and supported by a wall.

In summary, the disclosed memory alloy wire actuator 20 provides an increased operational life and increased amount of useable stroke compared to current memory wire devices through the ability to self-align the mechanical terminals 22 with the line of action of the memory alloy wire 24. This self-alignment eliminates stress concentrations from both misaligned components and cyclic motion of the mechanism in operation.

The previous description is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A lidded container, comprising:
   a body and a lid, the lid being coupled to the body and having a closed position configured to resist access to a compartment within the body, and an open position; and
   a latch release mechanism comprising a latch lever, a rotating element, an actuator, and a plunger, the plunger coupled to the rotating element and extending to the latch lever, wherein the actuator is coupled to the rotating element to move the rotating element in a first direction when the actuator is activated, and a biasing element is coupled to the rotating element to move the rotating element in a second direction that is different than the first direction;
   wherein, when the actuator is activated such that the rotating element moves in the first direction, engagement of the plunger against the latch lever moves the latch lever in the first direction to permit the lid to move to the open position, and when the actuator is not activated and the lid is moved from the open position to the closed position, the lid engages against the latch lever to move the latch lever away from the plunger, in the first direction.

2. The lidded container of claim 1, wherein the lid comprises a lid hook configured to engage against the latch lever to resist access to a compartment within the body when the lid is in the closed position.

3. The lidded container of claim 2, wherein, when the lid is moved from the open position to the closed position, the lid hook is configured to engage against the latch lever such that the latch lever is moved away from the plunger, in the first direction.

4. The lidded container of claim 1, wherein a first end of the plunger is coupled to the rotating element and the actuator, and a second end of the plunger is engaged against the latch lever.

5. The lidded container of claim 1, wherein the rotating element comprises a first end portion, a second end portion, and a fixed pivot between the first and second end portions, and wherein the plunger is coupled with the first end portion of the rotating element, and the biasing element is coupled to the second end portion of the rotating element.

6. The lidded container of claim 1, wherein the biasing element is selected from the group consisting of a torsion spring, a linear coil compression spring, a diaphragm spring, an elastic tension element, a gas spring, and a constant force mechanism.

7. The lidded container of claim 1, wherein the latch lever comprises another biasing element configured to bias the latch lever in the second direction.

8. The lidded container of claim 1, wherein, when the latch lever is moved in the first direction, relative to the rotating element, from a first position to a second position, a distance between the latch lever and the rotating element is increased.

9. The lidded container of claim 1, wherein the latch lever comprises a slot configured to receive a pin of the plunger therein.

10. The lidded container of claim 9, wherein, when the latch lever is moved in the first direction, relative to the rotating element, from a first position to a second position, the pin remains in the slot.

11. A lidded container, comprising:
a body, a lid, and a latch release mechanism, the latch release mechanism comprising a latch lever, a preload mechanism, and an actuator, the preload mechanism having a rotating element, a plunger, and a biasing element, wherein the actuator is coupled to the rotating element to cause the rotating element to rotate in a first direction from a first position to a second position when the actuator is activated, and the plunger is coupled to the rotating element and extends to the latch lever to move the latch lever in the first direction when the actuator is activated;
the biasing element having a first portion that is fixed relative to the rotating element and a second portion coupled to the rotating element, the biasing element configured to provide a restoring force to the rotating element in a second direction from the second position toward the first position when the actuator is not activated; and
the lid being coupled to the body and having a closed position configured to resist access to a compartment within the body, and an open position, wherein, when the lid is moved from the open position to the closed position when the actuator is not activated, engagement of the lid against the latch lever moves the latch lever away from the plunger.

12. The lidded container of claim 11, wherein the lid comprises a lid hook configured to engage against the latch lever to resist access to a compartment within the body when the lid is in the closed position.

13. The lidded container of claim 12, wherein, when the lid is moved from the open position to the closed position, the lid hook is configured to engage against the latch lever such that the latch lever is moved, relative to the rotating element, in the first direction.

14. The lidded container of claim 11, wherein the rotating element comprises a first end portion, a second end portion, and a fixed pivot between the first and second end portions.

15. The lidded container of claim 14, wherein the actuator is coupled with the first end portion of the rotating element, and the biasing element is coupled to the second end portion of the rotating element, such that the rotating element is rotatable about the fixed pivot.

16. The lidded container of claim 11, wherein the first direction is counterclockwise and the second direction is clockwise.

17. The lidded container of claim 11, wherein the biasing element is selected from the group consisting of a torsion spring, a linear coil compression spring, a diaphragm spring, an elastic tension element, a gas spring, and a constant force mechanism.

18. The lidded container of claim 11, wherein the latch lever is configured to move in the first direction when the actuator is activated to allow the lid to move from the closed position to the open position, and to move in the first direction when the lid moves from the open position to the closed position.

19. A lidded container, comprising:
a body and a lid, the lid being coupled to the body and having a closed position configured to resist access to a compartment within the body, and an open position; and
a latch release mechanism comprising a latch lever, a rotating element, an actuator, and a plunger, the rotating element having a first end portion, a second end portion, and a fixed pivot between the first and second end portions, wherein the actuator and the plunger are coupled with the first end portion of the rotating element, the plunger extends to the latch lever, and a biasing element is coupled to the second end portion of the rotating element, such that, when the actuator is activated, the rotating element and the latch lever move together in a first direction to permit the lid to move to the open position, and, when the actuator is not activated, the latch lever is separately movable from the plunger in the first direction to permit the lid to move from the open position to the closed position.

20. The lidded container of claim 19, wherein the latch lever comprises a slot configured to receive a pin of the plunger therein, and wherein, when the slot moves in a away from the pin when the lid to moves from the open position to the closed position when the actuator is not activated.

* * * * *